United States Patent
Ueda et al.

(10) Patent No.: US 9,306,434 B2
(45) Date of Patent: Apr. 5, 2016

(54) CONTROL APPARATUS FOR CONTROLLING ROTATION OF JOINTS OF ROBOT

(71) Applicants: DENSO WAVE INCORPORATED, Chita-gun, Aichi-pref. (JP); NIKON CORPORATION, Tokyo (JP)

(72) Inventors: Takeshi Ueda, Osaka (JP); Yoshiji Takahashi, Natori (JP); Toru Morita, Yokohama (JP); Kou Ohno, Sendai (JP)

(73) Assignees: DENSO WAVE INCORPORATED, Chita-gun, Aichi-Pref. (JP); NIKON CORPORATION, Tokyo (JP)

(*) Notice: Subject to any disclaimer, the term of this patent is extended or adjusted under 35 U.S.C. 154(b) by 0 days.

(21) Appl. No.: 14/387,736

(22) PCT Filed: Mar. 26, 2013

(86) PCT No.: PCT/JP2013/058703
§ 371 (c)(1),
(2) Date: Sep. 24, 2014

(87) PCT Pub. No.: WO2013/146743
PCT Pub. Date: Oct. 3, 2013

(65) Prior Publication Data
US 2015/0048724 A1  Feb. 19, 2015

(30) Foreign Application Priority Data
Mar. 30, 2012  (JP) ................. 2012-079143

(51) Int. Cl.
*G05B 19/19* (2006.01)
*H02K 11/00* (2006.01)
(Continued)

(52) U.S. Cl.
CPC ............... *H02K 11/0015* (2013.01); *B25J 9/10* (2013.01); *H02K 7/116* (2013.01)

(58) Field of Classification Search
CPC ............ G05B 19/19; G05B 2219/33337; G11B 19/28; G01B 5/004; H01L 21/67742; A61B 19/2203
USPC ......... 318/568.21, 568.2, 568.11, 568.12, 318/568.16, 628, 685, 400.01, 700, 400.14, 318/400.15, 400.4, 701, 721, 779, 799, 318/400.38, 400.39, 432, 437, 543; 700/193, 245, 248, 261, 302, 304
See application file for complete search history.

(56) References Cited

U.S. PATENT DOCUMENTS 5,530,331 A   6/1996  Hanei
6,091,219 A * 7/2000  Maruo ................... G05B 19/31
                                                318/562

FOREIGN PATENT DOCUMENTS

JP   A-4-357412   12/1992
JP   A-8-76822     3/1996
(Continued)

OTHER PUBLICATIONS

Oct. 9, 2014 International Preliminary Report on Patentability issued in International Application No. PCT/JP2013/058703.
(Continued)

*Primary Examiner* — Antony M Paul
(74) *Attorney, Agent, or Firm* — Oliff PLC

(57) ABSTRACT

A joint of a robot includes a driving motor, a speed reducer that reduces rotation of an output shaft of the motor, and an arm connected to the speed reducer. The joint includes an input encoder that detects a rotational position of the motor and an output encoder that detects a rotational position of the arm. A controller controls the motor based on data indicating the rotational positions of the motor and the arm detected by the input encoder and the output encoder, respectively. The input encoder is arranged with a register that latches and retains an input EC value. The output encoder includes a register that latches and retains an output EC value, and an edge pulse output section that outputs an edge pulse to both registers every time the output EC value changes. In response to the edge pulse, both registers concurrently output EC values to the controller.

7 Claims, 13 Drawing Sheets

(51) Int. Cl.
    *B25J 9/10*     (2006.01)
    *H02K 7/116*     (2006.01)

(56) References Cited

FOREIGN PATENT DOCUMENTS

| JP | A-2006-178730 | | 7/2006 | |
| JP | 2006260581 A | * | 9/2006 | ............. G05B 19/18 |
| JP | A-2006-260581 | | 9/2006 | |
| JP | A-2008-142786 | | 6/2008 | |
| JP | B2-4369886 | | 11/2009 | |
| JP | 2011134050 A | * | 7/2011 | ............... G05D 3/12 |
| JP | A-2011-134050 | | 7/2011 | |

OTHER PUBLICATIONS

International Search Report issued in International Application No. PCT/JP2013/058703 mailed May 14, 2013.
Oct. 27, 2015 Office Action issued in Japanese Patent Application No. 2012-079143.

* cited by examiner

CONTROL APPARATUS FOR CONTROLLING ROTATION OF JOINTS OF ROBOT

CROSS-REFERENCE TO RELATED APPLICATION

This application is based on and claims the benefit of priority from earlier Japanese Patent Application No. 2012-079143 filed on Mar. 30, 2012 the descriptions of which are incorporated herein by reference.

BACKGROUND

1. Technical Field

The present invention relates to a control apparatus for controlling rotation of joints of a robot, and in particular to a control apparatus for controlling rotation of joints having a structure in which the rotation of an electric motor is slowed down by a speed reducer and transmitted to an arm.

2. Background Art

Recently, a variety of robots are used in a variety of fields. Among them is a robot having a joint that includes an electric motor, a speed reducer that slows down the rotation of an output shaft of the motor, and an arm connected to the speed reducer. In controlling a rotational position of the arm in the joint, the motor is controlled in accordance with the rotational position of the arm, which is detected by an encoder. In this case, one may desire to confirm what value is actually used for the rotational position of the arm with the intervention of the speed reducer. As a method of confirming this, PTL 1, for example, discloses a method for detecting a rotational position of an arm using a potentiometer, in a configuration in which the motor and the arm are connected via a torque interrupter.

[Patent Literature 1] JP-B-4369886

In the configuration as described above, a control apparatus comprised such as of a microcomputer is required to refer to a motor-side rotational position and an arm-side rotational position at the same time point. For this purpose, one idea may, for example, be that the arm-side potentiometer is replaced by an encoder, as in the motor side, to deal with a rotational position in terms of digital data, and that the rotational position data outputted from the individual encoders are latched by respective latch circuits so that the control apparatus can read the data. Under this idea, what is important is the timing of reading the data of the two latch circuits.

In general, a motor is located closer to a control apparatus relative to an arm. Accordingly, in order that a control apparatus parallelly reads the arm-side and motor-side encoder data, it is appropriate that the arm-side data are transferred to the motor side and then both data are collectively and parallelly read in. This, however, may cause an offset in the detection time of both data, the offset being corresponding to the time taken for the transfer mentioned above. In other words, in a configuration of driving an arm of a robot, for example, via a speed reduction mechanism, the motor-side rotational position has a higher resolution and thus changes faster than the arm-side rotational position. Therefore, the received arm-side rotational position data are older than the motor-side rotation position data. For this reason, the offset in the timing associated with both rotational positions disables correct control of the motor.

SUMMARY

Therefore, it is desired that the data indicating input-side and output-side rotational positions in respect of an axis of a robot are acquired without a time lag.

According to a preferred embodiment, a control apparatus is provided, which controls rotation of a joint of a robot having a structure in which rotation of an electric motor is reduced by a speed reducer and transferred to an arm. The control apparatus includes a first encoder that detects a rotational position of the motor to output motor rotational position data indicating the rotational position; a second encoder that detects a rotational position of the arm to output arm rotational position data indicating the rotational position; a first latch circuit arranged in the first encoder latches the motor rotational position data; a second latch circuit arranged in the second encoder latches the arm rotational position data; a latch signal output means arranged in the second encoder outputs a latch signal to the first and second latch circuits every time there is a change in the arm rotational position data; and a control means-that controls, when the latch signal is outputted, rotation of the motor-on the basis of the motor rotational position data and the arm rotational position data latched in the first and second latch circuits.

The first encoder on a motor side and the second encoder on an arm side are arranged being structurally spaced apart from each other by some distance. In order that the control means corrects the rotational position of the arm, it is necessary to acquire the motor rotational position data and the arm rotational position data of the same time point. Since the arm is driven being interposed by the speed reducer, the resolution of the arm rotational position data is low relative to the motor rotational position data. In this regard, the latch signal output means is arranged in the second encoder, and a latch signal is outputted to the first and second latch circuits every time there is a change in the arm rotational position data. Thus, in the distanced first encoder as well, the motor rotational position data can be latched and retained concurrently with the above change.

Specifically, the change of data having a larger detection delay is used as a base point timing on a temporal axis. Thus, if the data having a smaller detection delay are offset in some degree, the value of the offset data substantially corresponds to the data having the larger detection delay. Accordingly, both of the data can be used as substantially concurrently detected values.

Accordingly, the rotation of the motor can be controlled using the motor rotational position data and the arm rotational position data that have been concurrently collected. Thus, the accuracy of controlling rotation of the motor can be enhanced.

DESCRIPTION OF EMBODIMENTS

With reference to the accompanying drawings, hereinafter are described various embodiments of a control apparatus for controlling rotation of a joint of a robot, which are related to the present invention. This robot as an example is an industrial robot set up such as in a factory.

First Embodiment

Referring to FIGS. 1 to 8, a control apparatus for controlling rotation of a joint of a robot, which is related to a first embodiment, is described.

Figure 1:
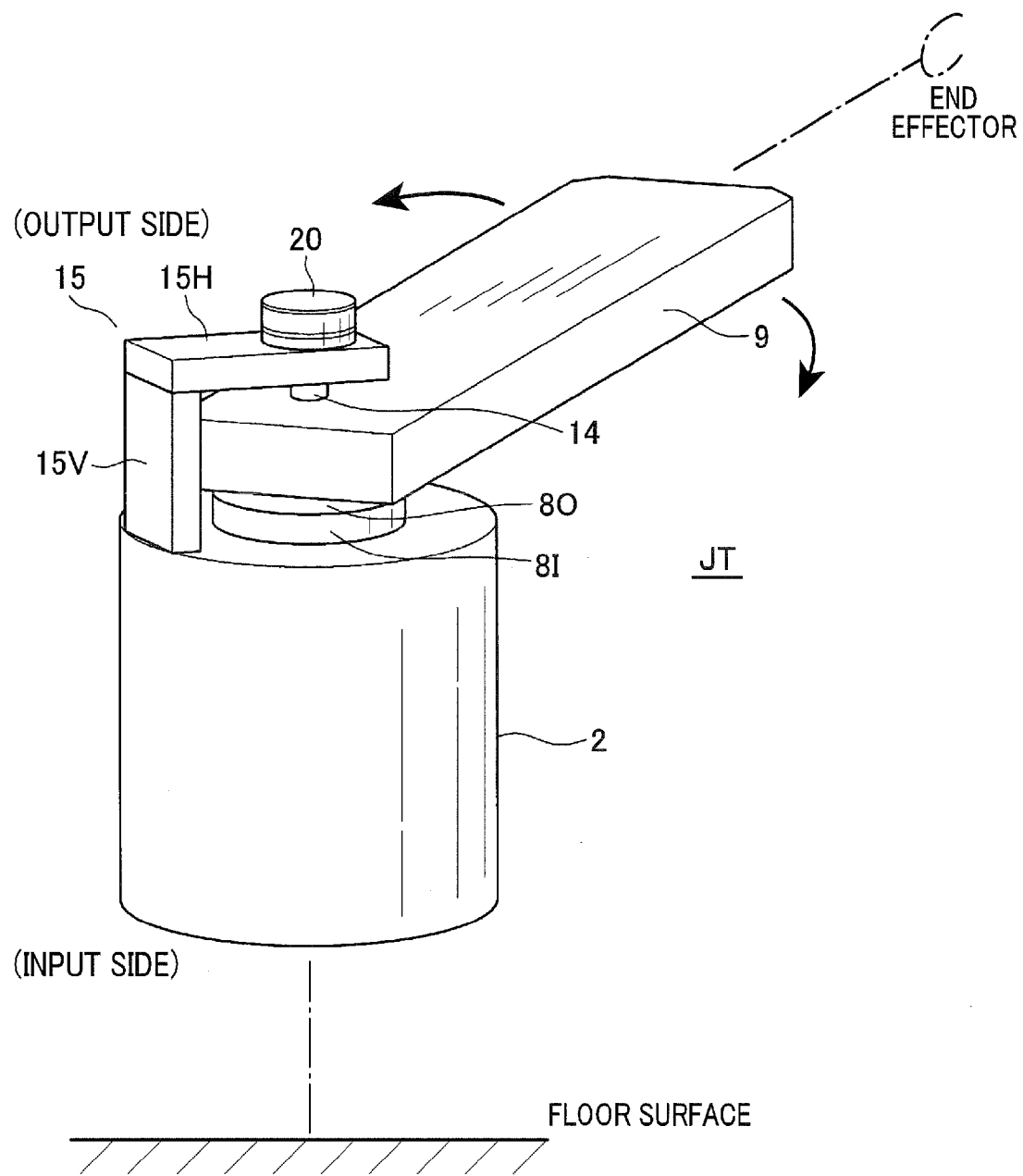
FIG. 1 is a perspective view schematically illustrating a configuration of a joint of a robot related to an embodiment.
Figure 7:
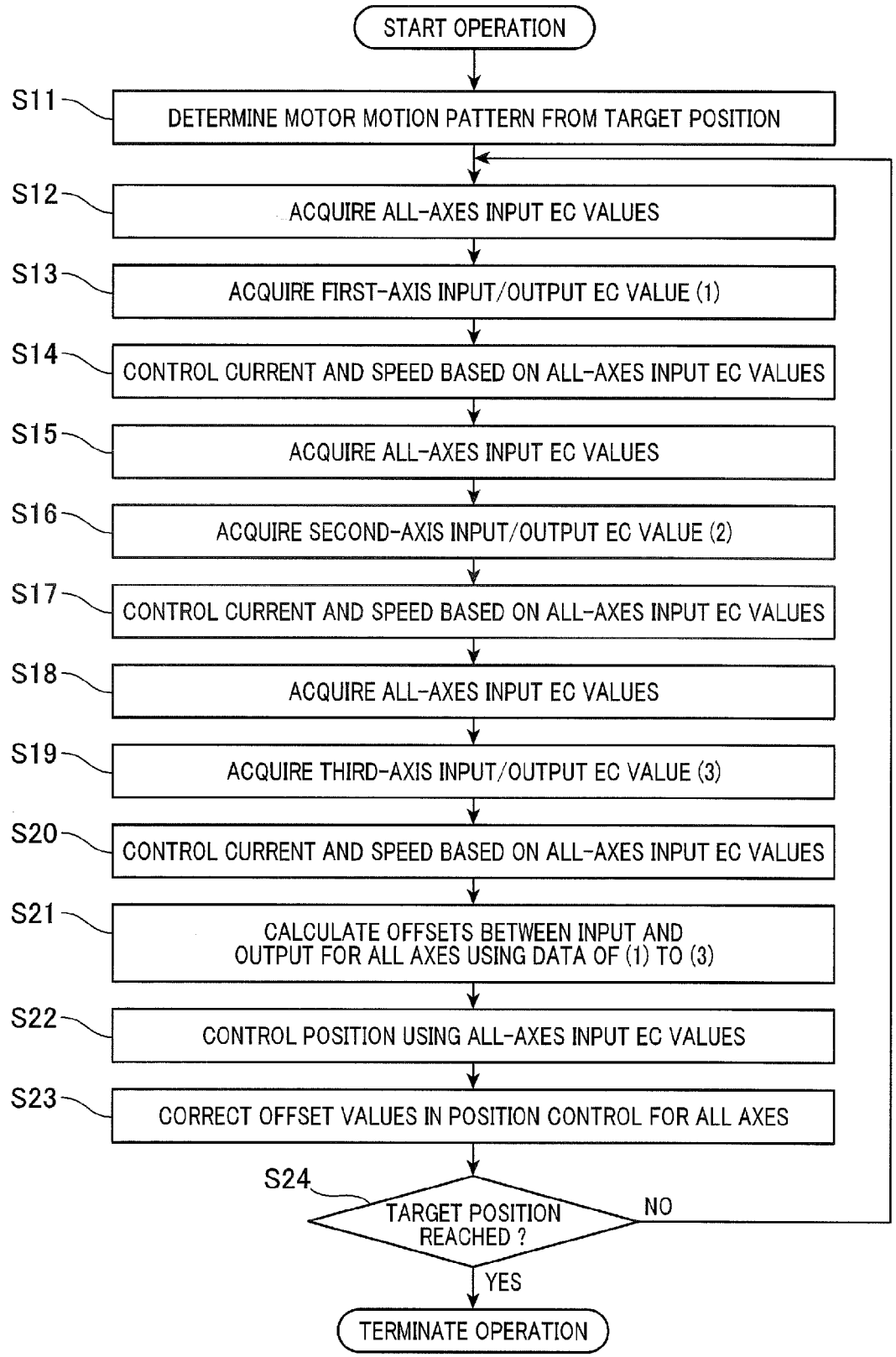
FIG. 7 is a flow chart illustrating a process through which a motor controller related to the first embodiment controls a three-axis robot.

FIG. 1 is a perspective view illustrating a configuration with which one of joints JT of a robot is driven by a motor. FIG. 7 is a vertical cross-sectional side view (although somewhat simplified) illustrating the configuration.

As shown in these figures, each joint JT includes an electrically-driven motor 1, a speed reducer 8 and an arm 9. In the joint JT, a driving force is transmitted from a motor 1 side to the arm 9 via the speed reducer 8. Therefore, the motor 1 side is referred to as "motor side or input side" as necessary and an arm 9 side is referred to as "arm side or output side" as necessary.

Figure 2:
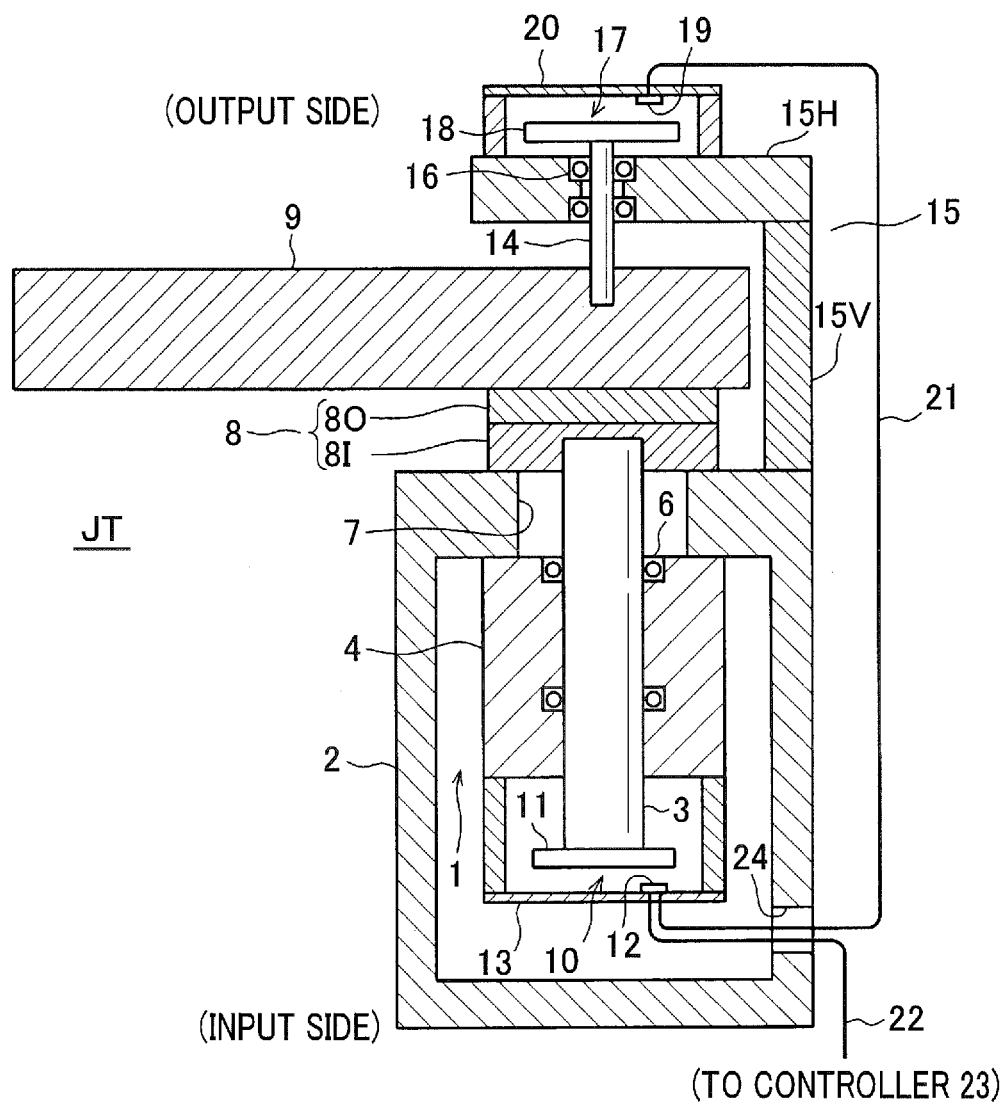
FIG. 2 is a vertical cross-sectional side view of the joint of a robot illustrated in FIG. 1.

The motor 1 is a permanent-magnet synchronous motor such as of an inner-rotor type, and includes a cylindrically-shaped base 2 in which a rotary shaft 3 is located in a state where its end is oriented upward in the figure. It should be noted that the motor 1 includes a stator 4 which is configured by a stator core and a winding (not shown), and that an upper end face of the stator 4 is fixed to and in contact with the rear of a top plate of the base 2. A rotor is configured by the rotary shaft 3, and a rotor core and permanent magnets that are arranged facing the stator-side winding (none of them is shown). FIG. 2 shows that the rotary shaft 3 is rotatably supported by the stator 4 via bearings 6.

The rotary shaft 3 has a rear end portion which is projected downward from a rear end face of the stator 4, and has a top end portion which is externally projected via a through hole 7 formed in the top plate of the base 2. The top end portion is connected to an input portion 8I of the speed reducer 8, while the arm 9 (controlled object or load) of the robot is connected to an output portion 8O. It should be noted that a detailed configuration of the speed reducer 8 is also omitted from the illustration. The rotary shaft 3 has a rear end face which is mounted with a rotary disc 11 that configures an optical rotary encoder (hereinafter referred to as input encoder (input EC; EC abbreviates an encoder)) 10.

Underneath the rotary disc 11, an input EC detector 12 is mounted to a bottom surface of a cup-shaped encoder support member 13 that is fixed to the rear end face of the stator 4. The input EC detector 12 includes a data processor which is comprised such as of a projector element and a light-receiving element, a counter (not shown), and a register which is discussed later. Specifically, the input EC detector 12 projects light toward a slit (not shown) of the rotary disc 11 located upward and receives the reflected light to thereby detect data that indicate the rotational position of the motor 1.

The arm 9 has an upper surface to which an arm rotary shaft 14 (output shaft) is mounted via a rear end portion thereof so as to be coaxial with the rotary shaft 3 (input shaft) of the motor 1. On the right end of the top plate of the base 2 as viewed in FIG. 2, a shaft support member 15 is arranged, which is comprised of a vertical portion 15V extending upward, and a horizontal portion 15H arranged at a top end of the vertical portion 15V so as to be parallel to the arm 9. The arm rotary shaft 14 passes through the horizontal portion 15H, while being rotatably supported by bearings 16 that are arranged in the horizontal portion 15H.

The arm rotary shaft 14 has a top end face which is mounted with a rotary disc 18 that configures an optical encoder 17 (hereinafter referred to as output encoder (output EC)). The output encoder 17 has a configuration similar to the input encoder 10. Above the rotary disc 18, an output EC detector 19 is mounted to the rear of a top plate of an inverted cup-shaped encoder support member 20 that is fixed to an upper surface of the horizontal portion 15H. The output EC detector 19 is comprised such as of a projector element and a light-receiving element, and a counter. Specifically, the output EC detector 19 projects light toward a slit of the rotary disc 18 located below and receives the reflected light to thereby detect the rotational position of the arm 9.

The input EC detector 12 of the input encoder 10 is connected to the output EC detector 19 of the output encoder 17 via a relay bus 21. The rotational position data detected by the output EC detector 19 are transferred to the input EC detector 12 via the relay bus 21. Further, the output EC detector 19 also transmits an edge pulse signal for data latching to the input EC detector 12 via the relay bus 21. Then, the input EC detector 12 combines the above rotational position data and the rotational position data detected by itself, followed by outputting the combined data to a motor controller 23 (see FIG. 3) via a data bus 22. It should be noted that the relay bus 21 and the data bus 22 are internally and externally drawn out of the base 2 via a through hole 24 formed in the base 2.

Figure 3:
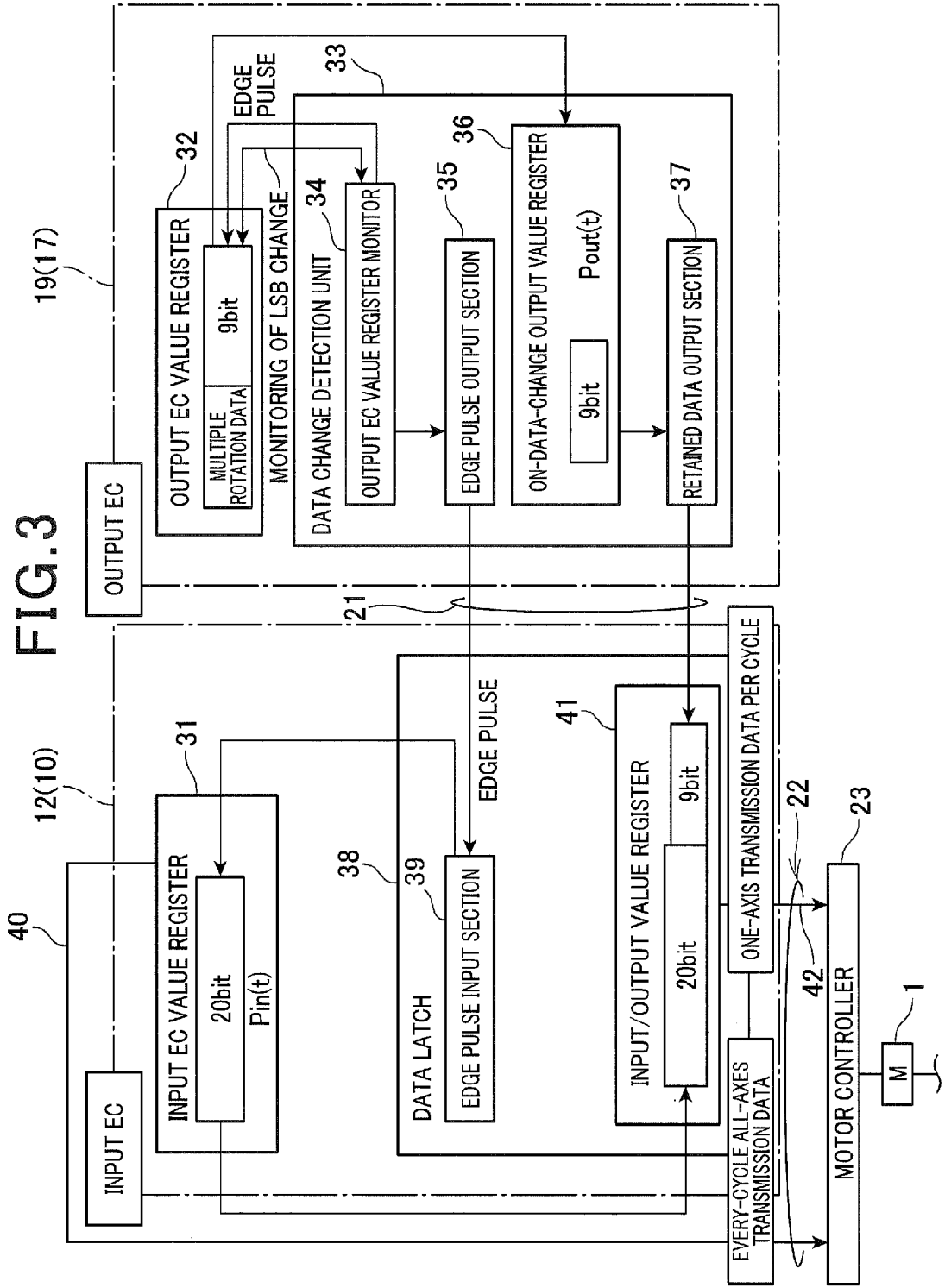
FIG. 3 is a functional block diagram mainly illustrating configurations of data processors of both of motor-side and arm-side encoders related to a first embodiment.

FIG. 3 is a functional block diagram illustrating a control apparatus that controls the rotation of the joints JT of the robot. The control apparatus includes the input encoder 10, the output encoder 17 and the motor controller 23.

The input EC detector 12 includes an input EC value register 31 (that functions as an input data latch means) such as of 20 bits, which retains data of a counter that counts the number of pulses outputted from a light receiver. Similarly, the output EC detector 19 includes an output EC value register 32 (that functions as an output data latch means) which retains data of a counter. For example, the rotational position data of the arm 9 are nine bits (whose size is smaller than on the input side due to the intervention of the speed reducer 8), but the register also stores multiple rotation data (e.g., of two bits) that indicate the number of times of overflows of the counter, to cope with the case where the number of rotations of the arm 9 is one or more. However, the multiple rotation data are not dealt with in the present embodiment.

In the output EC detector 19, an output EC value register monitor 34, which configures a data change detection unit 33, monitors whether or not LSB (Least Significant Bit) of the output EC value register 32 has changed. Upon detection of such a change (i.e. upon increment of a counter value), the output EC value register monitor 34 outputs an edge pulse to the output EC value register 32 and at the same time outputs a pulse output command to an edge pulse output section 35 (that functions as a latch signal output means). In response, the edge pulse output section 35 transmits an edge pulse (latch signal) used for latching to the input detector 12.

On a rising edge of the edge pulse, an on-data-change output value register 36 stores and retains nine-bit rotational position data Pout(t) latched by the EC value register 32. The retained rotational position data Pout(t) are transmitted to the input EC detector 12 via a retained data output section 37. In other words, the edge pulse output section 35 and the retained data output section 37 serve as drivers that transmit the edge pulse and the rotational position data Pout(t), respectively, to the input EC detector 12.

In the input EC detector 12, an edge pulse input section 39 of a data latch 38 receives the edge pulse transmitted from the edge pulse output section 35 of the output EC detector 19. The edge pulse input section 39 outputs the edge pulse to an input EC value register 31. Thus, the rotational position data Pout(t) in the on-data-change output value register 36 and rotational position data Pin(t) in the input value register 31 turn out to be latched on a rising edge of the same edge pulse.

The rotational position data Pin(t) are outputted to the motor controller 23 (control apparatus) via an input value data bus 40 that configures a part of the data bus 22 mentioned above, and at the same time transferred to an input/output value register 41 of the data latch 38. Further, the rotational position data Pout(t) transmitted from the retained data output section 37 of the output EC detector 19 are also transferred to the input/output value register 41. The rotational position data Pin(t) and Pout(t) having 29 bits in total are outputted to the motor controller 23 via an input/output value data bus 42 that configures a part of the data bus 22.

It should be noted that the size of each of the data buses 40 and 42 is actually 32 bits, and the bits of data, which are not used for transmission, are pulled up or down. In the following description, the rotational position data Pin(t) of 20 bits are referred to as input EC value, while the rotational position data of Pin(t) and Pout(t) of 29 bits are referred to as input/output EC value.

Figure 4:
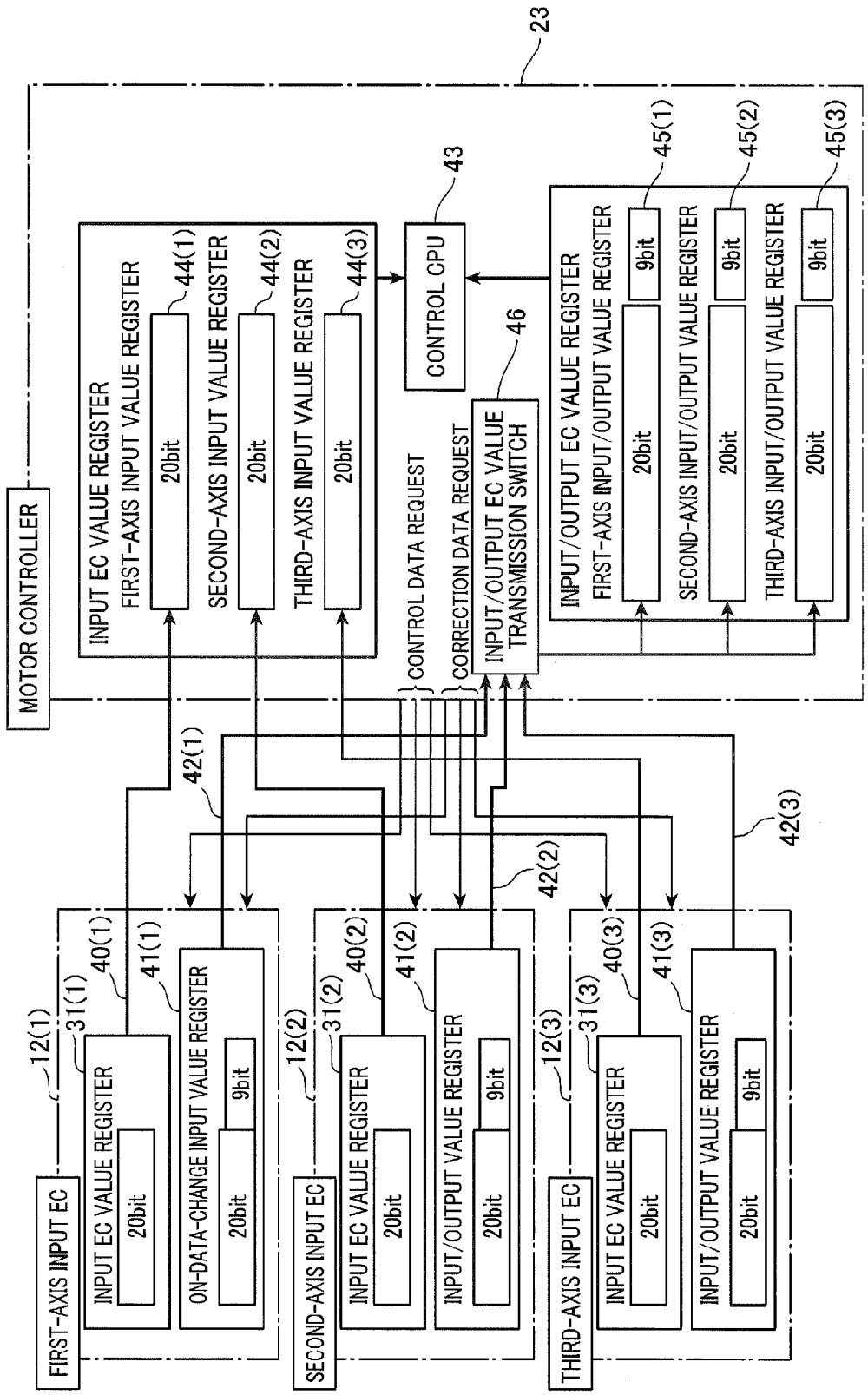
FIG. 4 is a functional diagram illustrating a circuit for controlling a motor of each of joints for use in a three-axis robot exemplified in the first embodiment.

FIG. 4 is a functional block diagram illustrating an internal configuration of the motor controller (hereinafter just referred to as controller) 23. Assuming a multiaxis configuration, e.g. assuming an application of the joint to each axis of a three-axis robot, FIG. 4 shows a connection of each of the input EC detectors 12 (1 to 3) to the motor controller 23 in the case where three sets of the configuration illustrated in FIG. 3 are used. (1) to (3) affixed to the signs correspond to first to third axes, respectively, of the robot. The both are connected via a communication interface, not shown.

The controller 23 is configured by a microcomputer that mainly includes a control CPU 43, as well as ROM, RAM and other peripheral circuits, not shown. Input EC value registers 44 (1 to 3) serve as registers into which the input EC values (1 to 3) of 20 bits are written via the communication interface. Further, input/output EC value registers 45 (1 to 3) serve as registers into which the input/output EC values of 29 bits transmitted from the input EC detectors 12 (1 to 3) are written via an input/output EC value transmission switch 46. In addition, the communication interface and the input/output EC value transmission switch 46 are each configured, for example, by FPGA (Field Programmable Gate Array) or the like.

A data transmission request to be given to the input EC detectors 12 (1 to 3) is outputted by the controller 23. In the figure, "control data request" refers to a request for transferring the input EC values corresponding to three axes, and "correction data request" refers to a request for transferring the input/output EC value corresponding to one axis. The control CPU 43 has a 32-bit configuration, for example, and reads out the rotational position data stored in the input EC value registers 44 and the input/output EC value registers 45 to thereby control the robot as will be discussed later.

Referring now to FIGS. 5 to 8, hereinafter is described an operation in the present embodiment.

Figure 5:
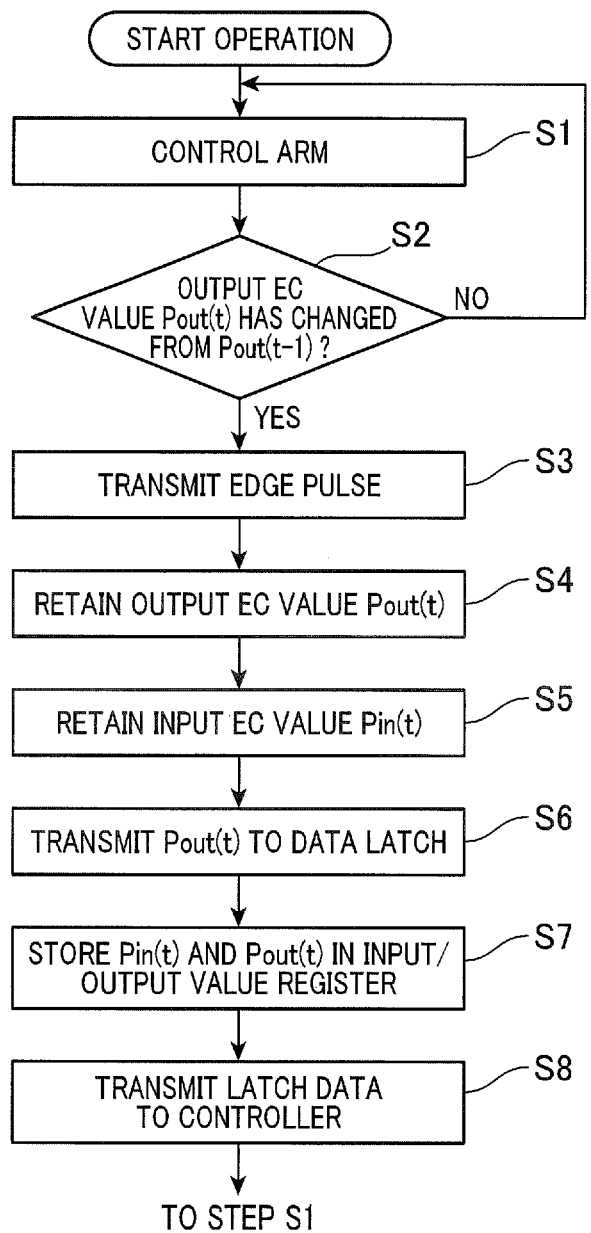
FIG. 5 is a flow chart illustrating a transfer process for rotational position data performed between the motor-side and arm-side encoders in the first embodiment.

FIG. 5 is a flow chart illustrating a transfer process for rotational position data, which is performed between the input EC detector 12 and the output EC detector 19 shown in FIG. 3. It should be noted that the flow chart expresses functions that are cooperatively performed by both detectors 12 and 19, and the motor controller 23.

The control CPU 43 performs control discussed later to activate the motor 1 and thereby control the rotation of the arm 9 of the robot (step S1). Then, the output EC value monitor 34 waits, while determining, at every predetermined time interval, whether or not LSB of the output EC value register 32 has changed (from Pout (t−1) to Pout(t)) (step S2). If such a change is determined to have occurred (YES at step S2), the edge pulse output section 35 outputs an edge pulse (step S3). In response to the output of the edge pulse, the output EC value register 32 is permitted to latch the rotational position data Pout(t) (step S4).

The edge pulse is also transmitted to the input EC detector 12 via the relay bus 21. Accordingly, the edge pulse is outputted to the input EC value register 31 via the edge pulse input section 39. Thus, the input EC value register 31 is permitted to latch the rotational position data Pin(t) of the time point when the edge pulse is inputted (step S5).

Further, the rotational position data Pout(t) are transmitted from the retained data output section 37 of the output EC detector 19 to the data latch 38 (step S6). Thus, the rotational position data Pin(t) and Pout(t) are stored in the input/output value register 41 (step S7). Then, the rotational position data Pin(t) stored in the input EC value register 31, and the rotational position data Pin(t) and Pout(t) stored in the input/output value register 41 are transmitted to the motor controller 23 via the data buses 40 and 42, respectively (step S8).

Figure 6:
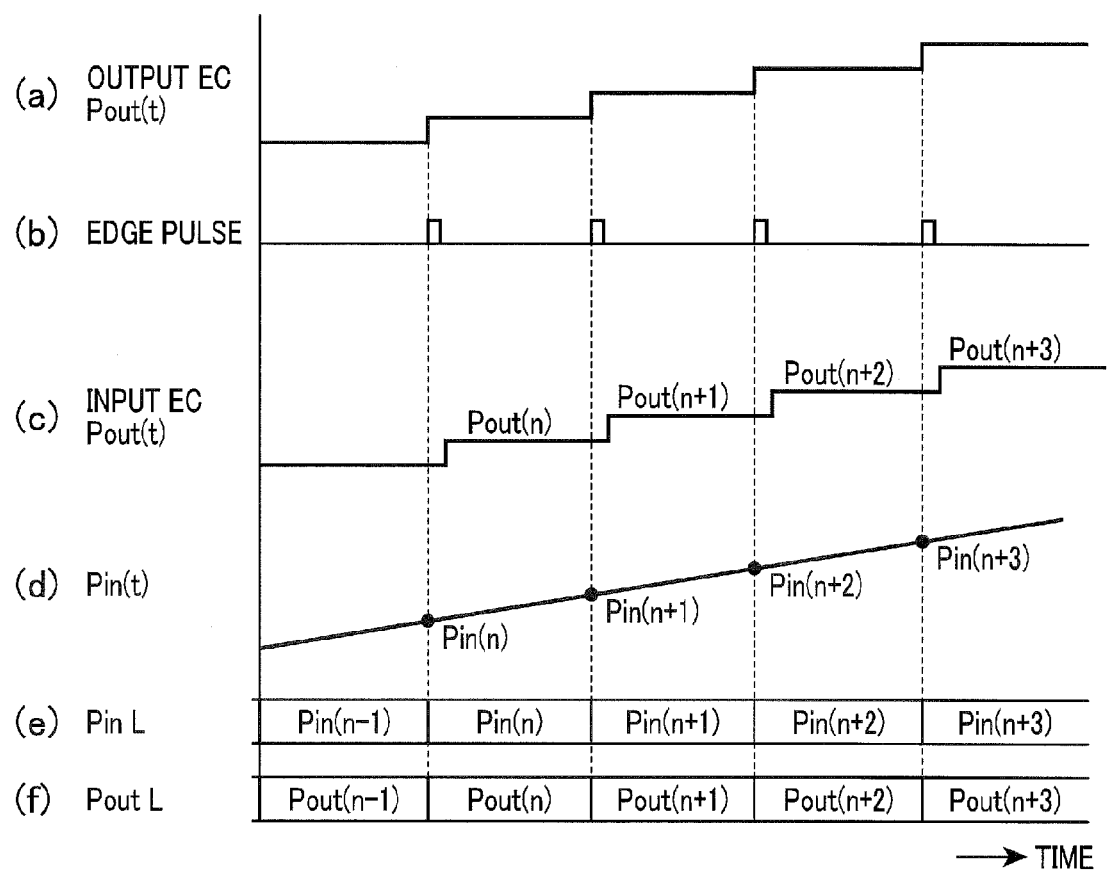
FIG. 6 is a timing chart illustrating variation of rotational position data of a motor and an arm.

FIG. 6 is a timing chart illustrating change of both the rotational position data Pin(t) and Pout(t) in the process described above. Upon change of the rotational position data Pout(t) in the output encoder 17, an edge pulse is generated (see (a) and (b)), and rotational position data Pout(n) at this time point and rotational position data Pin(n) on the input encoder 10 side are latched (see (e) and f)). Further, FIG. 6(*c*) shows delay when the rotational position data Pout(t) transmitted from the output encoder 17 are received by the input encoder 10. Thus, latched rotational position data Pin L and Pout L substantially turn out to be concurrently detected data. In other words, the change of the data Pout(t) having a larger detection delay is used as a base point timing on a temporal axis. Thus, if the data Pin(t) having a smaller detection delay are offset in some degree, the value of the offset data substantially corresponds to the data having the larger detection delay. Accordingly, both the data Pin L and Pout L can be used as substantially concurrently detected values.

Next, FIG. 7 is a flow chart illustrating a process in the case where the control CPU 43 of the motor controller 23 controls the three-axis robot. It should be noted that, in the following description, the rotational position data Pin(n) are referred to as "input EC value", while the rotational position data Pout(t) are referred to as "output EC value". First, when a motion pattern of each of the axes is determined from a target position of the end effector of the robot (step S11), the control CPU 43 reads out the input EC values of the three axes (all-axes input EC value) from the input EC value registers 44 by performing a read cycle for three times (step S12).

Subsequently, when a first-axis input/output EC value is read out from the input/output EC value register 45 (1) (step S13), current control and speed control are performed to activate the axis motors 1 (1 to 3) on the basis of the all-axes input EC value acquired at step S12. The current control and the speed control here refers to performing PI (proportional integral), for example, on the basis of a deviation between a speed command and an actual speed, in activating the motors 1 using drive circuits, such as inverters.

At the subsequent steps S15 to S17, processing patterns similar to those of steps S12 to S14 are performed but, at step S16, a second-axis input/output EC value is read out instead of the first axis as at step S13. The same applies to the subsequent steps S18 to S20 as well but, at step S19, a third-axis input/output EC value is read out instead of the second axis as at step S16.

At the subsequent step S21, the first- to third-axis input/output EC values acquired at steps S13, S16 and S19 are used to calculate a difference (offset) between the input EC value and the output EC value for each of the axes. Then position control of the end effector of the robot is performed on the basis of the input EC values of all of the axes (step S22). In this case, the position control is corrected according to the values of the offsets calculated at step S21 (step S23). Then, when the end effector of the robot has reached a target position (YES at step S24), the operation is terminated, but when it has not yet reached the target position (NO at step S24), control returns to step S12 and the processing described above is repeated.

In the process shown in FIG. 7, the processings of the controller 23 from the acquisition of data from the input EC detectors 12 to the storage of data into the input EC value registers 44 and the input/output EC value registers 45 is performed by the communication interface mentioned above at a predetermined cycle. When the data are stored in the registers 44 and 45, an interrupt is caused by the communication interface, for example, so that the control CPU 43 can start the processing on and after step S12 and can access to the input EC value registers 44.

Figure 8:
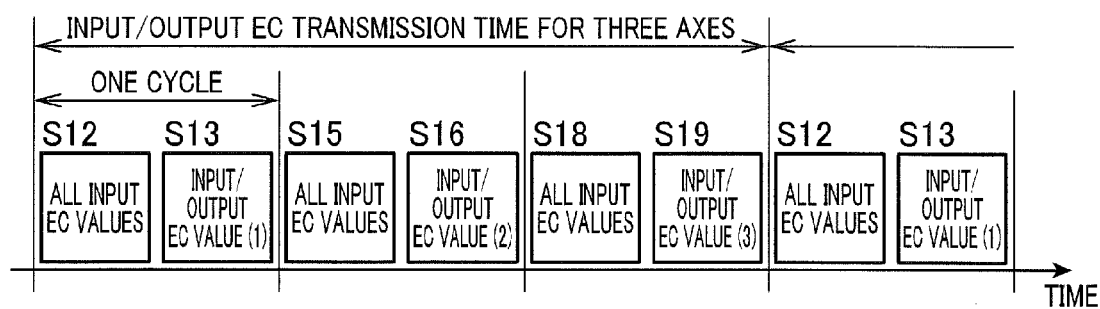
FIG. 8 is a timing chart illustrating transfer of rotational position data correlated to the process illustrated in FIG. 7.

As a result of performing the process as described above, the input EC values and the input/output EC values of the individual axes are transferred, as shown in FIG. 8, to the controller 23. In other words, the all-axes input EC value is transferred at every transmission cycle and the input/output EC values of the individual axes are sequentially transferred at different transmission cycles.

According to the present embodiment as described above, a joint of a robot includes the input encoder 10 that detects a rotational position of the motor 1, and an output encoder 17 that detects a rotational position of the arm 9 via the speed reducer 8. The controller 23 acquires the rotational position data (EC values) detected by the input encoder 10 and the output encoder 17 to thereby control the motor 1. Further, the input encoder 10 is arranged with the input EC value register 31 that latches the input EC value, while the output encoder 17 is provided with the output EC value register 32 that latches the output EC value, and an edge pulse output section 35 that outputs an edge pulse to the registers 31 and 32 every time there is a change in the output EC value.

Specifically, the input encoder 10 on the motor 1 side is structurally spaced apart by some distance from the output encoder 17 on the arm 9 side. In order that the controller 23 corrects the rotational position of the arm 9, it is necessary to acquire the input EC value and the output EC value of the same time point. Since the arm 9 is driven via the speed reducer 8, the resolution of the output EC value is low relative to the input EC value. Accordingly, by arranging the edge pulse output section 35 in the output encoder 17 and outputting an edge pulse to the registers 31 and 32 every time there is a change in the output EC value, the input EC value can also be latched and retained in the distanced input encoder 10 substantially concurrently with the above change.

Further, the controller 23 acquires the EC values detected by the input encoders 10 (1 to 3) and the output encoders 17 (1 to 3) of a plurality of axes to control the respective motors 1 (1 to 3). In order to perform the control, at a predetermined cycle, the controller 23 acquires the input EC values of all of the axes, while acquiring an input EC value and an output EC value of one axis by sequentially switching the axes. Specifically, the input EC values of the individual axes are necessary for controlling the position of the end effector of the robot and thus are acquired at a predetermined cycle. Further, in one axis, if an error occurs in the output EC value, which is obtained via the speed reducer 8, relative to the input EC value, the error is required to be corrected. Therefore, the input EC value and the output EC value for conducting the correction are acquired on a one-axis basis at a predetermined cycle by sequentially switching the axes, thereby enabling correction of the output rotational positions of the individual axes, while suppressing the size of the data in transfer.

Further, it is desirable that the data used for correcting a rotational position are the data acquired at the same time point. Accordingly, while the input EC values are acquired on an all-axes basis at the same cycle, the data used for correction are separately acquired as a set of the input EC value and the output EC value on a one-axis basis. Thus, the correction can be performed with high accuracy.

Thus, each output EC value is ensured to be transferred once from the output encoder 17 to the input encoder 10 and then to the controller 23 via the input encoder 10. Specifically, the input EC value and the output EC value of each axis are combined and concurrently transferred to the controller 23 to achieve good efficiency. As mentioned above, the output EC value has a low resolution and a small data size. Therefore, by transferring the output EC value to the input encoder 10 and then to the controller 23, the relay bus 21 connecting between the output encoder 17 and the input encoder 10 is permitted to have a small width.

In this case, the input encoder 10 is provided with the input value register 31 for transferring the input EC value to the controller 23, and the input/output register 41 for transferring the input EC value to the control apparatus together with the output EC value. Accordingly, efficient transfer is achieved in respect of the input EC value which is transferred at a predetermined cycle as a part for all the axes, and in respect of the data which are transferred once in a plurality of cycles as a set of the input EC value and the output EC value for one axis. In addition, the controller 23 is able to rapidly acquire and process the data.

Second Embodiment

Referring to FIGS. 9 to 12, hereinafter is described a detection apparatus related to a second embodiment.

It should be noted that in the second and the subsequent examples and modifications, the components identical with or similar to those of the first embodiment are given the same reference numerals for the sake of omitting or simplifying explanation.

Figure 9:
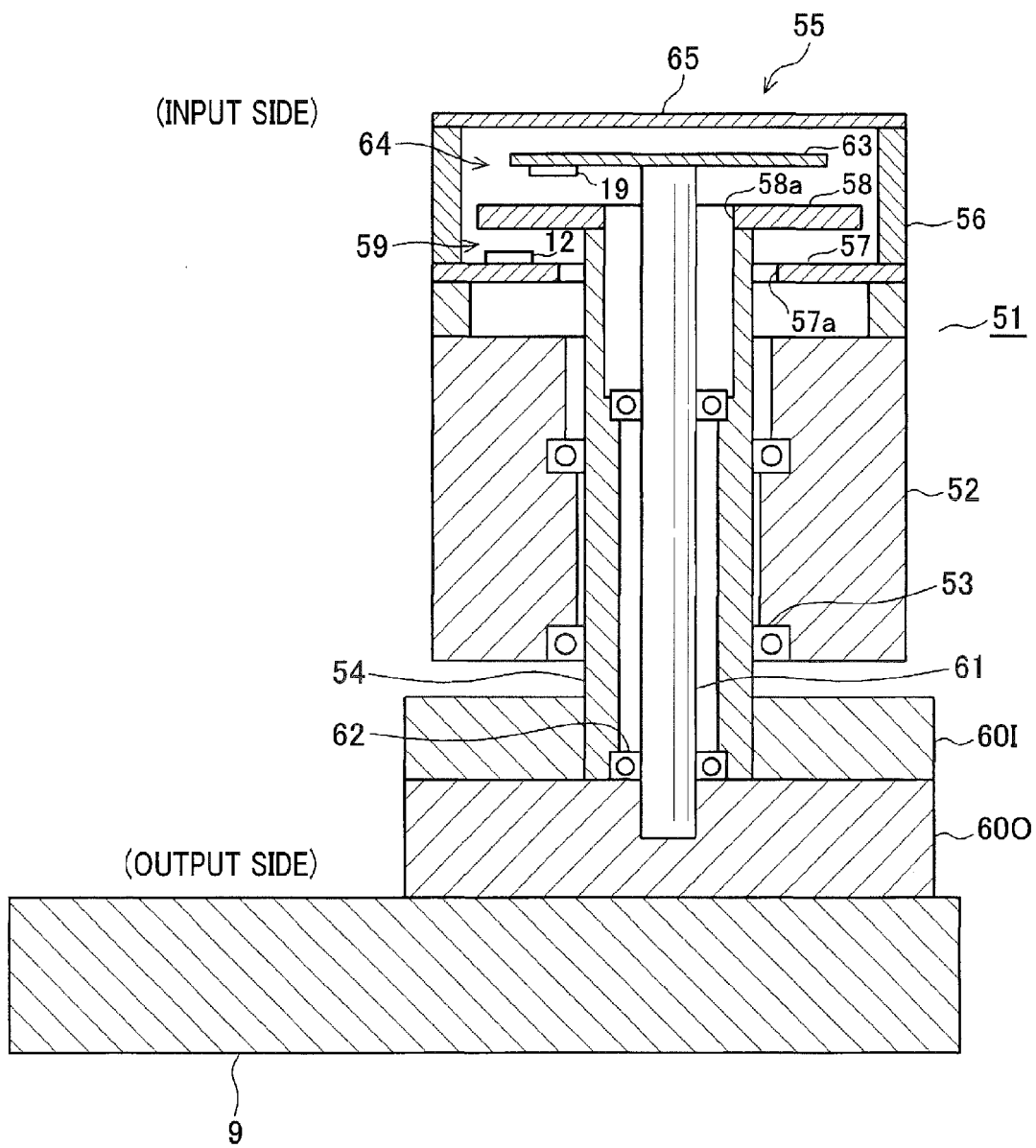
FIG. 9 is a vertical cross-sectional side view of a joint of a robot related to a second embodiment.

In the second embodiment, the configuration corresponding to the input encoder 10 and the output encoder 17 of the first embodiment is integrally arranged on a rear end side of the rotary shaft of the motor. FIG. 9 is a vertically reversed diagram of FIG. 7 (a state where the input side and the output side are reversed). Similar to the motor 1, a motor 51 is a permanent-magnet synchronous motor of an inner-rotor type and includes a stator 52 and a rotary shaft (rotor) 54 that is rotatably supported by bearings 53 arranged on an inner peripheral side of the stator 52. On a rear end side of the motor 51, an encoder housing 55 is arranged.

The encoder housing 55 includes an annular side wall 56 that is mounted to a rear end of the stator 52, and a disk-shaped support member 57 (fixing portion) that is fixedly inserted into a mid portion of the side wall 56. The support member 57 has a center portion in which a through hole 57a is formed to provide a so-called doughnut shape. The rotary shaft 54 (input shaft) has a rear end portion which is inserted into the through hole 57a of the support member 57, with a rotary disc (rotary plate) 58 configuring the encoder being fixed to a rear end of the rotary shaft. The support member 57 has an upper surface on which the input EC detector 12 is arranged so as to face the rotary disc 58. In other words, the rotary disc 58 and the input EC detector 12 configure an input encoder unit 59 that corresponds to the input encoder 10 of the first embodiment.

The rotary shaft 54 is configured by a hollow member that has a top end which is fixed to an inner periphery of a hollow of an input portion 601 that configures a speed reducer 60. The speed reducer 60 has an output portion 600 to which the arm 9 is connected. In the hollow of the rotary shaft 54, an output shaft 61 is inserted with a rear end thereof being fixed to the arm 9. The rotary shaft 54 has an inner periphery in which bearings 62 are arranged so as to rotatably support the output shaft 61.

The rotary disc 58 is formed with an insertion hole 58a having a diameter equal to that of the hollow of the rotary shaft 54. The output shaft 61 has a top end which is projected into a space inside the encoder housing 55 by way of the insertion hole 58a. A rotary disc 63 having a diameter larger than that of the rotary shaft 54 is fixed to the top end of the output shaft. The rotary disc 63 has a lower surface on which the output EC detector 19 is arranged so as to face the rotary disc 58. In other words, the rotary disc 58 and the output EC detector 19 configure an output encoder unit 64 that corresponds to the output encoder 17 of the first embodiment.

Figure 10:
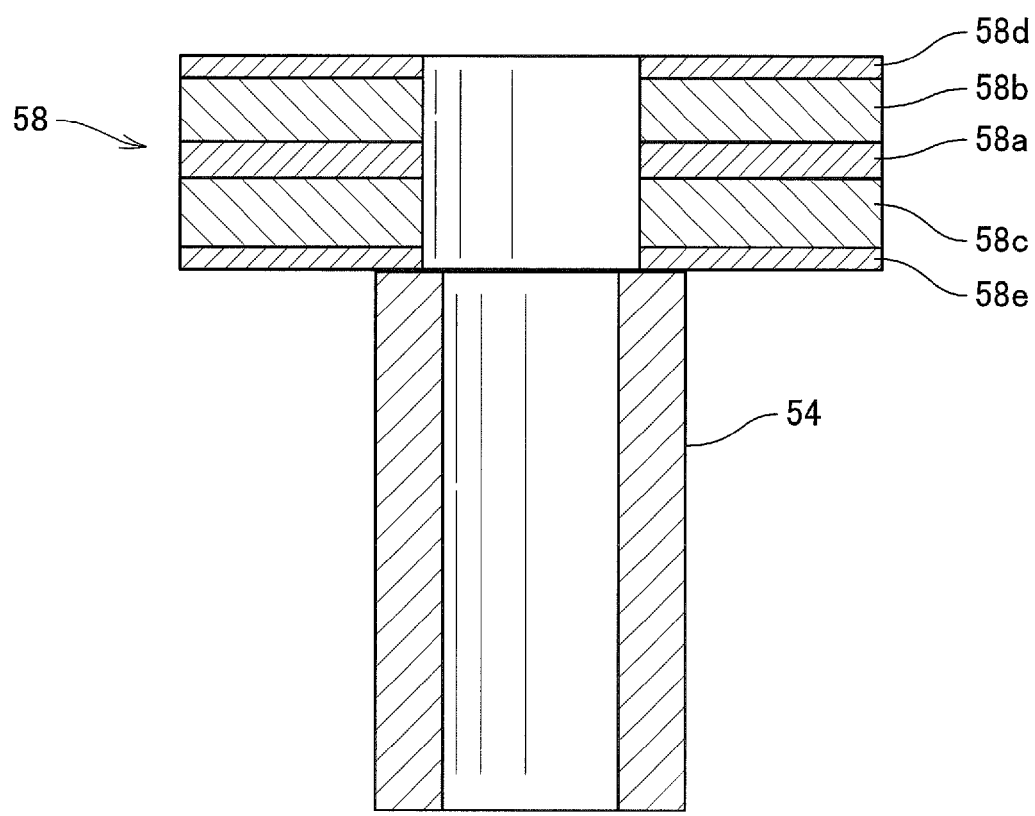
FIG. 10 is a vertical cross-sectional side view of a rotary disc illustrated in FIG. 9.

In the second embodiment, light is projected from both of the lower surface side and the upper surface side of the rotary disc 58 for the detection of a rotational position. Accordingly, the rotary disc 58 is formed with a position detection pattern (e.g., slit) in each of first and second two surfaces (e.g. both surfaces, or the upper surface and the side surface). FIG. 10 shows a cross-sectional structure (partial) of the rotary disc 58. The rotary disc 58 has a five-layer structure in which glass plates 58b and 58c are arranged above and beneath a light-shielding plate 58a, and slit films 58d and 58e are arranged above and beneath the glass plates 58b and 58c, respectively. A slit is formed in both of the slit films 58d and 58e.

Although not shown, wired connection is used for the supply of power source to the output EC detector 19 arranged on the rotary disc 63, and for the transfer of an edge pulse and rotational position data to the input EC detector 12. The arm 9 may rotate for multiple of times but the number of rotations is three or so at the most, and thus the wire length of the connection may only have to have room for the rotation. The encoder housing 55 has a top portion to which a cover 65 is attached to cover the opening.

Figure 11:
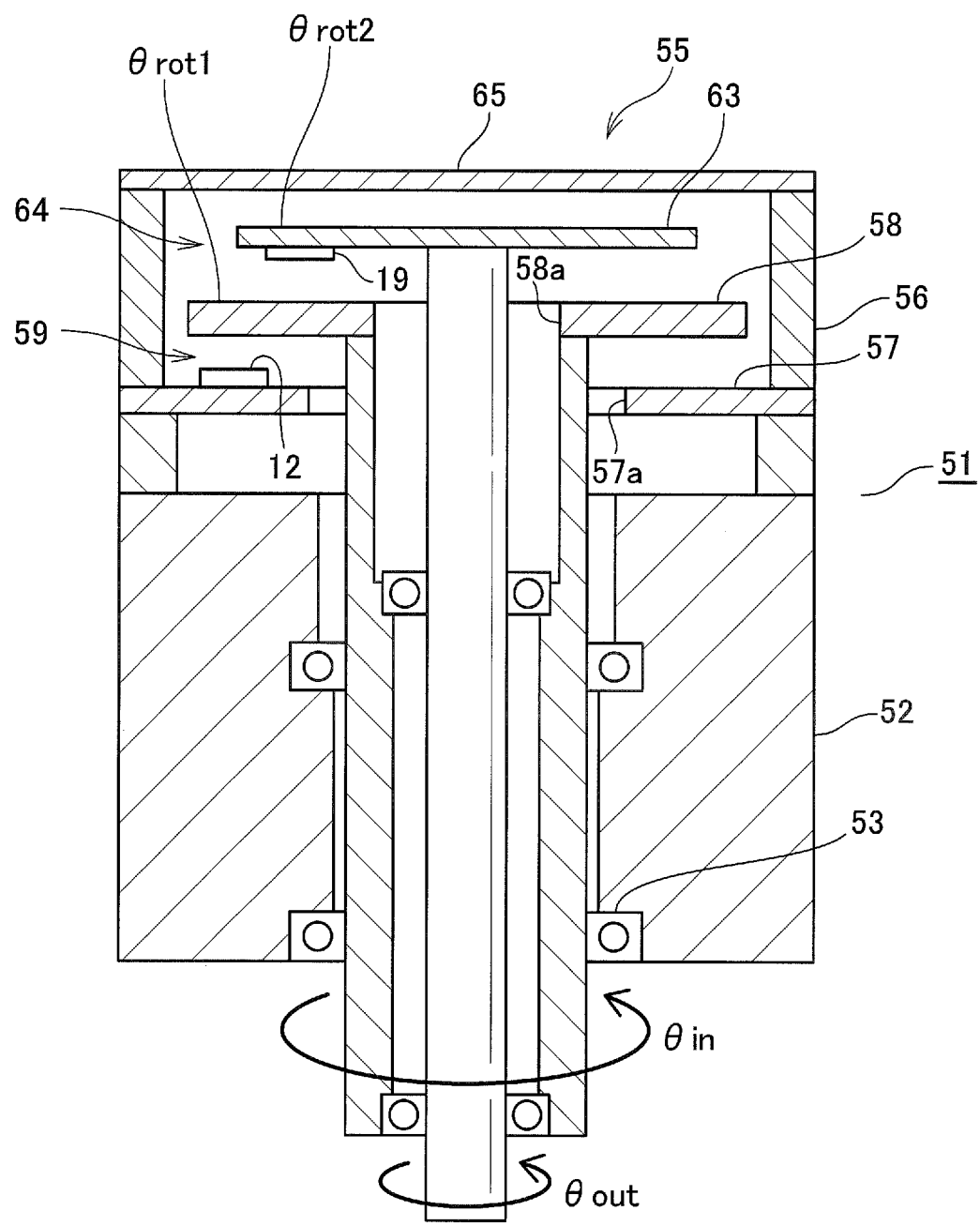
FIG. 11 is a diagram explaining calculation of an output angle.
Figure 12:
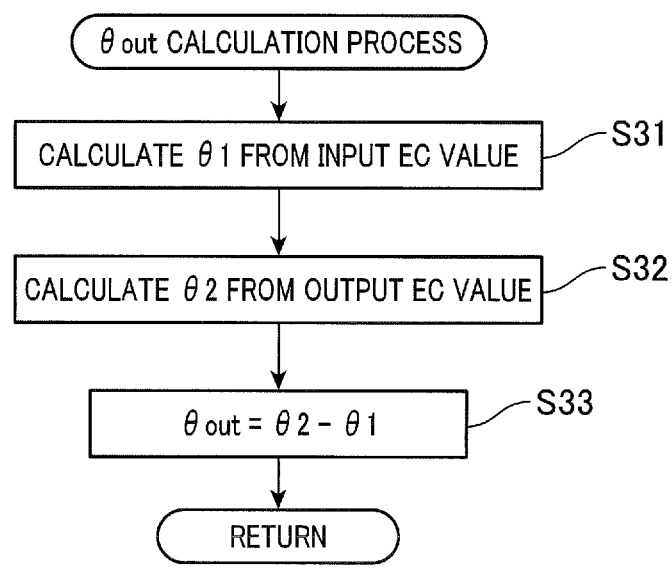
FIG. 12 is a flow chart illustrating a calculation process for an output angle.

Referring now to FIGS. 11 and 12, an operation of the second embodiment is described.

FIG. 11 shows a diagram from which the speed reducer 60 and the arm 9 are omitted. When the motor 51 is activated to rotate the arm 9, the rotary disc 58 rotates with the rotation of the rotary shaft 54. Accordingly, the input encoder unit 59 is able to detect the rotational position of the motor in completely the same way as the input encoder 10 does in the first embodiment. On the other hand, the rotary disc 63 rotates with the rotation of the output shaft 61 of the arm 9. When the rotary disc 58 here has a rotation angle $\theta rot1$, and the rotary disc 63, assuming that it rotates in the same direction as the rotary disc 58, has a rotation angle $\theta rot2$, an angle $\theta 1$ detected in the input EC detector 12 is equal to $\theta rot1$. Further, an angle $\theta 2$ detected in the output EC detector 19 is expressed by:

$$\theta 2 = \theta rot1 - \theta rot2$$

Accordingly, a rotation angle $\theta in$ of the motor 51 is expressed by:

$$\theta in = \theta 1 = \theta rot1$$

and a rotation angle $\theta out$ of the arm 9 can be calculated as:

$$\theta out = \theta 1 - \theta 2 = \theta rot1 - (\theta rot1 - \theta rot2) = \theta rot2$$

Specifically, for example, when the control CPU 43 reads the input/output EC values at steps S13, S16 and S19, a process shown in FIG. 12 is performed to calculate the rotation angle $\theta out$. First, the rotation angle $\theta 1$ is calculated from an input EC value Pin(t) using the following formula (step S31). However, a is a speed reduction ratio of the speed reducer 8.

$$\theta 1 = 0.360 \times Pin(t)/(2^{20} \times a)[\deg]$$

Then, the rotation angle $\theta 2$ is calculated from an output EC value Pout(t) using the following formula (step S32).

$$\theta 2 = 360 \times Pout(t)/(2^{9} \times a)[\deg]$$

Then, the rotation angle $\theta out$ is calculated by subtracting the rotation angle $\theta 2$ from the rotation angle $\theta 1$ (step S33). It should be noted that the above process may be performed using hard logic.

According to the second embodiment described above, the rotary shaft 54 of the motor 51 is formed into a hollow shape, and the output shaft 61 of is directly connected, via its rear end, to the arm 9, and inserted into the hollow of the rotary shaft 54 to draw out the top end of the output shaft to the rear end side. Further, in order to detect the rotational position of the motor 51 and to detect the rotational position of the arm 9 that is interposed by the speed reducer 60, by using the optical input encoder unit 59 and output encoder unit 64, respectively, the rotary disc 58 used by these is commonalized and fixed to the rear end side of the rotary shaft 54. Further, the detector 19 of the output encoder unit 64 is ensured to be mounted to the top end side of the output shaft 61, and the detector 10 of the input encoder unit 59 is ensured to be mounted to the support member 57 which is located on an opposite side of the detector 19 sandwiching the rotary disc 58 therebetween. It should be noted that, for example, the detector 10 of the input encoder unit 59 may be mounted to the side wall 56 serving as a fixing portion.

With this configuration, the rotational position of the motor 51 can be normally acquired on the basis of the detection results of the detector 10 of the input encoder unit 59. On the other hand, the rotational position of the arm 9 can be obtained on the basis of the difference between the rotational position detected by the input encoder unit 59 and the rotational position detected by the output encoder unit 64 in the controller 23 that performs processings by reading data from the two detectors 10 and 19. Specifically, the input and output encoder units 59 and 64 detect the respective rotational positions on the basis of the rotation of the single rotary disc 58 and therefore a detection error associated with the offset of the axis is unlikely to occur. Further, the encoder units 59 and 64 are collectively arranged at the rear end side of the motor 51 and accordingly the arrangement space is reduced as much as possible. This leads to achieving a downsized encoder system that is in use of two encoders, as well as a downsized configuration in which the encoder system is combined with loads.

Specifically, as in the second embodiment, use of the rotary shaft 54 having a hollow shape enables a collective arrangement of the encoder units 59 and 64 on the rear end side of the motor 51. Thus, it is no longer necessary to arrange the output encoder unit 64 between the speed reducer 60 and the arm 9.

Further, the detector 10 of the input side encoder 59 is mounted to the fixing portion located on the opposite side of the detector 19 of the output-side encoder 64, sandwiching the rotary disc 58 therebetween. Accordingly, there is no probability that the optical signals outputted by the two optical encoders 59 and 64, respectively, for the detection of the rotational positions are received by the mutually wrong detectors 19 and 10, thereby preventing erroneous detection. In addition, one surface of the rotary disc 58 is provided with a slit for the output-side encoder 59 and the other surface thereof is provided with a slit for the input-side encoder 64. Accordingly, the reflected light for the detectors 10 and 19 to perform rotational position detection can be received in a state of no mutual interference.

Third Embodiment

Figure 13:
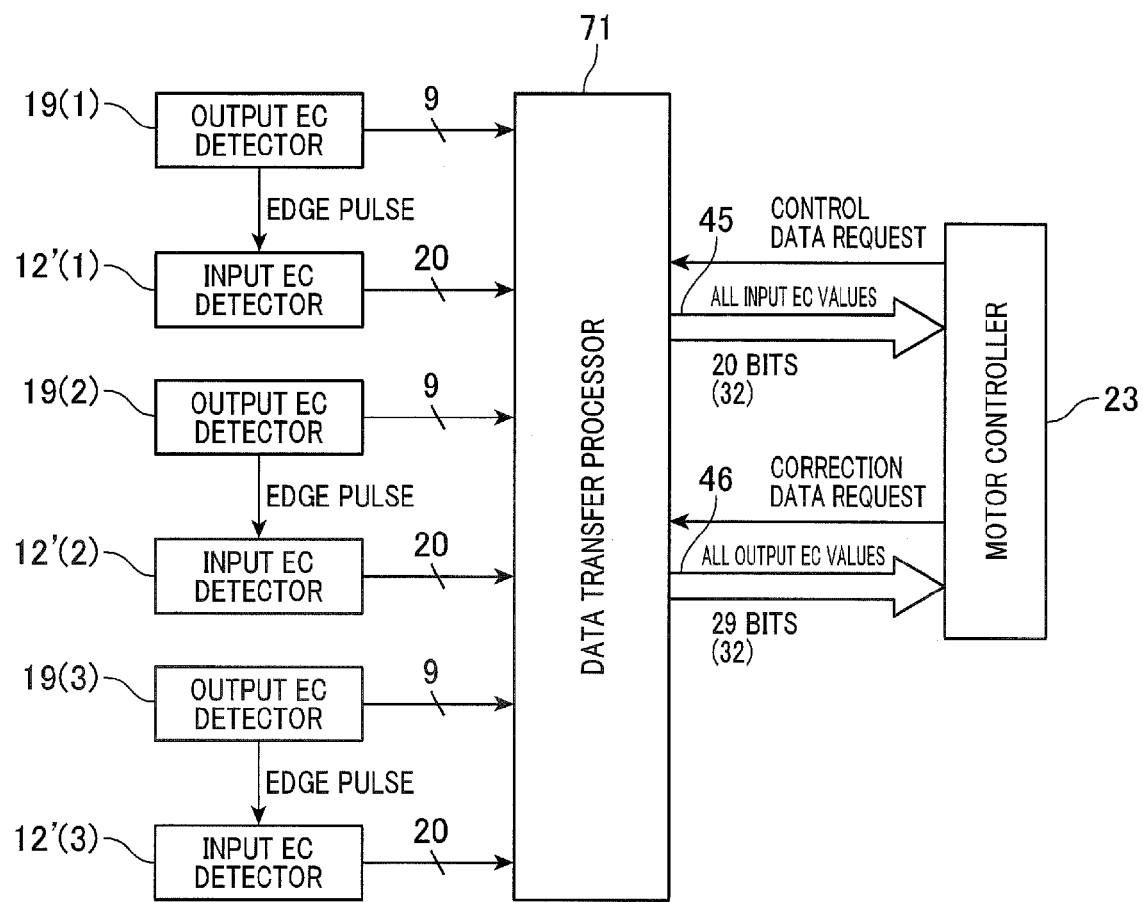
FIG. 13 is a functional block diagram illustrating a circuit for controlling a motor of each joint, related to a third embodiment.

Referring to FIG. 13, a detection apparatus related to a third embodiment is described.

The third embodiment exemplifies a configuration in which a data transfer processor 71 is arranged between input EC detectors 12' (1 to 3) and the output EC detectors 19 (1 to 3), and the controller 23. The data transfer processor 71 has functions of the input/output EC value register provided in the input EC detector 12 and of the communication interface. Accordingly, the output EC detector 19 directly transfers a nine-bit output EC value to the data transfer processor 71.

Then, in response to a request from a controller 23 side communication interface 43R and 44, the data transfer processor 71 outputs a 20-bit input EC value and a 29-bit input/output EC value to the controller 23 side. In the third embodiment configured as above as well, effects similar to those of the first embodiment are obtained.

The present invention should not be construed as being limited to the embodiments described above alone, but may be modified or extended as still other embodiments as follows.

The number of bits of the input encoder and the output encoder may be appropriately changed in accord with individual designs.

The data transfer method, as shown in FIG. 4, which is performed between the input EC detectors 12 of the three axes and the controller 23 may also be appropriately changed. For example, the both may be connected via two 32-bit buses, and a communication interface used may select input EC values (20 bits) of three axes and input/output EC values (29 bit) of three axes to transfer data of only one axis in one time communication to the controller 23 side.

Further, the size of the buses is not limited to 32 bits, but may be 20 bits or 29 bits as a minimum size for each of them.

Alternatively, the input EC values and the input/output EC values may be transferred via a common 32-bit (or 29-bit) bus.

In the second embodiment, the rotary shaft 54 and the output shaft 61 may be rotated in mutually opposite directions, depending on the configuration of the speed reducer 60.

The present invention may be applied to four or more-axis robot. Further, application of the present invention should not be construed as being limited to a robot with a multiaxis configuration but the present invention may be applied to the control of a single-axis motor.

The present invention described above is not limited by the above-described embodiments. The present invention can be applied to various embodiments without departing from the spirit thereof.

REFERENCE SIGNS LIST 1 is a motor,
8 is a speed reducer,
9 is an arm (load),
10 is an input encoder (first encoder),
12 is an input EC detector,
17 is an output encoder (second encoder),
19 is an output EC detector,
21 is a relay bus (control means),
22 is a data bus (control means)
23 is a motor controller (control apparatus, control means),
31 is an input EC value register (first latch circuit),
32 is an output EC value register (second latch circuit)
34 is an output EC value register monitor (latch signal output means),
35 is an edge pulse output section (latch signal output means),
36 is an on-data-change output value register (control means (transfer means)),
37 is a retained data output section (control means (transfer means)),
39 is an edge pulse input section (control means),
41 is an input/output value register (control means), and
JT is a joint.

The invention claimed is:

1. A control apparatus that controls rotation of a joint of a robot having a structure in which rotation of an electric motor is reduced by a speed reducer and transferred to an arm, comprising:
a first encoder that detects a rotational position of the motor to output motor rotational position data indicating the rotational position;
a second encoder that detects a rotational position of the arm to output arm rotational position data indicating the rotational position;
a first latch circuit arranged in the first encoder and latches the motor rotational position data;
a second latch circuit arranged in the second encoder and latches the arm rotational position data;
a latch signal output means arranged in the second encoder outputs a latch signal to the first and second latch circuits every time there is a change in the arm rotational position data; and
a control means that controls, when the latch signal is outputted, rotation of the motor on the basis of the motor rotational position data and the arm rotational position data latched in the first and second latch circuits.

2. The control apparatus according to claim 1, wherein:
the control means comprises:
- a controller that controls rotation of the motor;
- a transfer means that transfers the arm rotational position data latched in the second latch circuit from the second encoder to the first encoder when the latch signal is outputted; and
- a data combining means arranged in the first encoder combines, when the latch signal is outputted, the motor rotational position data latched in the first latch circuit with the arm rotational position data transferred by the transfer means, for provision to the controller.

3. The control apparatus according to claim 2, wherein:
the data combining means comprises:
- a register that combines the motor rotational position data and the arm position rotation data into parallel data at a rate of predetermined numbers of bits; and
- a data bus that transfers the parallel data outputted by the register to the controller.

4. The control apparatus according to claim 2, wherein the first and second encoders are connected to each other by a relay bus that transmits the latch signal and the arm rotational position data from the second encoder to the first encoder.

5. The control apparatus according to claim 3, wherein the number of bits of the arm rotational position data is smaller than the number of bits of the motor rotational position data.

6. The control apparatus according to claim 3, wherein the first and second encoders are connected to each other by a relay bus that transmits the latch signal and the arm rotational position data from the second encoder to the first encoder.

7. The control apparatus according to claim 3, wherein the first and second encoders are connected to each other by a relay bus that transmits the latch signal and the arm rotational position data from the second encoder to the first encoder.

* * * * *